No. 716,563. Patented Dec. 23, 1902.
D. N. LONG.
ACETYLENE GAS GENERATOR.
(Application filed Dec. 20, 1900.)
(No Model.) 2 Sheets—Sheet 1.
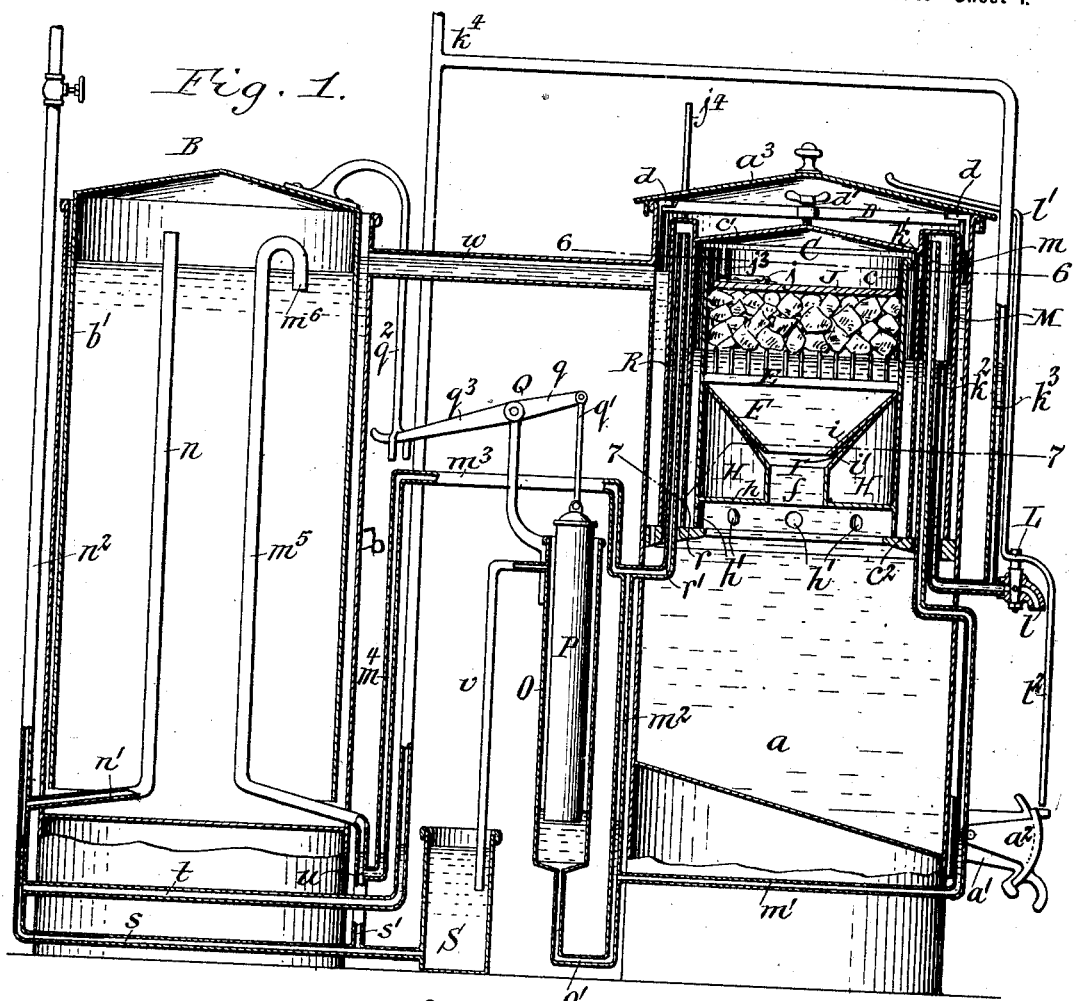
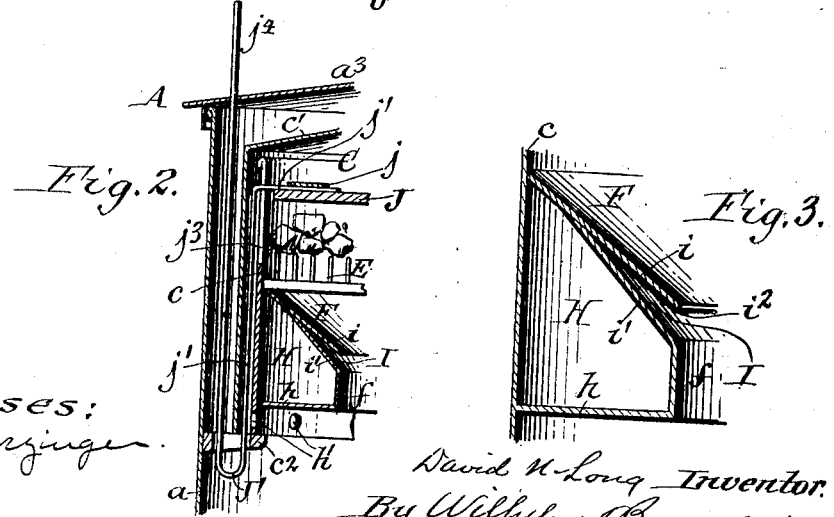

No. 716,563. Patented Dec. 23, 1902.
D. N. LONG.
ACETYLENE GAS GENERATOR.
(Application filed Dec. 20, 1900.)
(No Model.) 2 Sheets—Sheet 2.
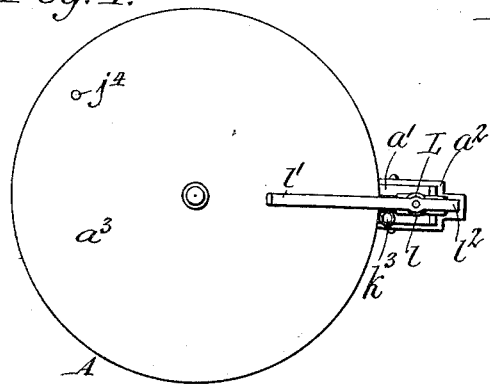
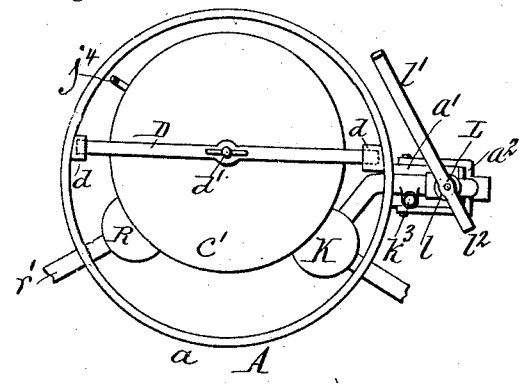
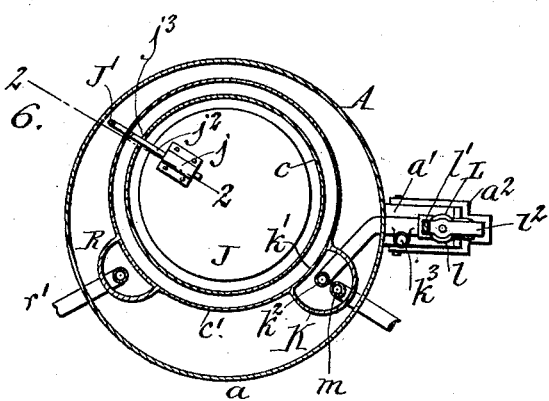
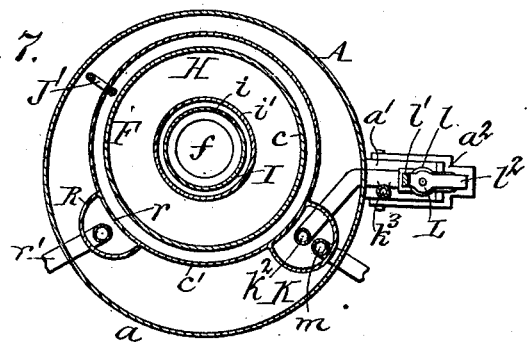
Witnesses:
F. F. Scherzinger
E. A. Volk
David N. Long Inventor.
By Wilhelm Bonner
Attorneys.

UNITED STATES PATENT OFFICE.

DAVID N. LONG, OF BUFFALO, NEW YORK, ASSIGNOR TO FREDERICK C. M. LAUTZ, OF BUFFALO, NEW YORK.

ACETYLENE-GAS GENERATOR.

SPECIFICATION forming part of Letters Patent No. 716,563, dated December 23, 1902.

Application filed December 20, 1900. Serial No. 40,481. (No model.)

*To all whom it may concern:*

Be it known that I, DAVID N. LONG, a citizen of the United States, and a resident of Buffalo, in the county of Erie and State of New York, have invented a new and useful Improvement in Acetylene-Gas Generators, of which the following is a specification.

This invention relates to acetylene-gas generators of that type in which the water acts upon the lower portion of the charge of carbid and in which the generation of gas is regulated by the variation in the pressure of the gas upon the water, whereby the water is permitted to rise into contact with the carbid when the gas-pressure falls and is forced downwardly out of contact with the carbid when the gas-pressure rises.

The objects of this invention are to reduce the area of water which is exposed to the carbid while the generation is checked, thereby reducing the tendency to continue the generation of gas by moisture suspended in the gas; to provide effective means whereby moisture is prevented from creeping by capillary or other attraction upwardly along the side of the generating-chamber to the carbid and prolonging the generation of gas; to provide simple means for determining the amount of carbid in the generator without opening the same; to provide automatic means for ventilating the generating-chamber when recharging the same; to regulate the generation of gas by varying the height of a water column in the gas-pipe which delivers the gas from the generator; to provide simple means for relieving an excessive gas-pressure, and to improve the apparatus in other respects.

In the accompanying drawings, consisting of two sheets, Figure 1 is a vertical sectional elevation of an acetylene-gas generator embodying my improvements. Fig. 2 is a fragmentary vertical section of the generator, taken in line 2 2, Fig. 6, and showing the indicator for determining the amount of carbid in the generator. Fig. 3 is a fragmentary sectional elevation, on an enlarged scale, showing the trap whereby the water is prevented from creeping up along the inner side of the generating-chamber to the carbid. Fig. 4 is a top plan view of the generator. Fig. 5 is a similar view of the generator with the cover removed. Figs. 6 and 7 are horizontal sections in lines 6 6 and 7 7, Fig. 1, respectively.

Like letters of reference refer to like parts in the several figures.

A represents the generator in which the acetylene-gas is produced, and B the holder or gasometer in which the surplus gas is stored.

$a$ represents the water-tank of the generator, which is provided at its lower end with a discharge-spout $a'$, having a vertically-swinging valve or gate $a^2$ for removing the contents of the tank. The tank is provided with a cover $a^3$ for inclosing the parts contained in the upper end of the tank.

C represents the generating-chamber, consisting of an inner supporting shell $c$ and an outer dome $c'$, inclosing the shell. The lower end of the shell and dome are both submerged in the water of the generating-tank to form a water seal. The supporting-shell $c$ is open at its upper and lower ends and rests at its lower end on a shelf or shoulder $c^2$, arranged on the inner side of the generator-tank. The dome $c'$ is closed at its upper end and open at its lower end. The dome is removably held down upon the shelf $c^2$ by a clamping-bar D, which extends across the top of the dome and projects with its ends underneath shoulders or lugs $d$ on the generator-tank, and a clamping-screw $d'$, arranged on the clamping-bar and bearing upon the top of the dome.

E represents the open support or grate upon which the charge of carbid rests and which is arranged in the central part of the supporting-shell. This support may be of any suitable construction which permits the lower portion of the charge of carbid to be acted upon by the water rising in the tank below the support. The generation of the gas is regulated automatically in a well-known manner by the gas-pressure acting upon the water, which permits the water to rise to the carbid when the pressure is low and depresses the water-level below the carbid when the pressure is high.

When the water has been pressed below the carbid by the gas-pressure, the generation of gas still continues to a small extent by reason of the moisture which is suspended or contained in the gas and which reaches the carbid from the surface of the water below the carbid. In order to reduce this latent generation of gas to a minimum after the water has been forced out of contact with the carbid, the supporting-shell is contracted below the carbid-support, so that the area of the water exposed to the carbid becomes gradually less as the water is depressed. For this purpose an inverted hollow truncated cone F is arranged in the lower part of the supporting-shell and connected at its upper large end to the inner side of the shell adjacent to the carbid-support.

$f$ represents a cylindrical neck which is connected with the lower narrow end of the cone and extends downwardly therefrom to a point which is always below the water-level. The diameter of the neck $f$ is sufficiently large to permit the water to rise promptly into contact with the carbid when the gas-pressure drops below the normal.

When the water has been forced downwardly in the shell by the gas until the water-level is within the neck $f$, the minimum water-surface is exposed to the carbid. The location of the upper end of the neck $f$ is so determined that when the water is exposed to the normal gas-pressure the water-level stands in the upper end of the neck. When the gas-pressure is abnormally high, the water will be pressed down farther in the neck without changing the area exposed to the carbid, inasmuch as the cross area of the neck is the same throughout its height, thereby permitting of a variation in the water-level after the pressure has risen above the normal without varying the area of the water-surface exposed to the carbid.

The lower end of the neck $f$ is connected with the lower part of the supporting-shell by a bottom plate $h$, which forms, with the shell $c$, neck $f$, and cone F, an air-tight drum H in the lower part of the shell. This drum displaces a considerable amount of useless water in the generator and also takes the place of the air which otherwise would enter the generator upon recharging the same and which would have to be expelled in order to avoid too great a dilution of the gas upon resuming the generation of gas.

The lower end of the supporting-shell is provided with openings $h'$, which permit the water to circulate freely between the dome and shell and the tank of the generator.

When the water-level is depressed by the gas-pressure out of contact with the carbid, a considerable amount of moisture is conducted from the water to the carbid by the capillary or other attraction of the coating of lime on the inner side of the neck, cone, and shell, whereby a slow generation of gas is continued, which is undesirable. In order to prevent the moisture from thus creeping upwardly along the inner side of the wall leading to the carbid-support, an internal trap I is formed in this wall. This trap is preferably formed in the cone by constructing the lower part of the cone of two overlying cone-sections $i\ i'$, as shown in Figs. 1, 2, and 3. The upper section $i$ overhangs the lower section $i'$, thus forming a trap, which imprisons a small amount of air when the water rises above the trap. This trap checks the creeping of moisture along the inner side of the generator-wall, because the moisture does not readily creep over the trap, owing to the comparatively dry state of the air trapped in the same, and also because the moisture does not readily creep upwardly around the overhanging upper part $i$ of the trap. In order to still further guard against the moisture creeping over the trap, the under side of the overhanging part $i$ is coated with paraffin or some other oily or water-repellent substance, as shown at $i^2$ in Fig. 3.

For the purpose of determining the amount of unconsumed carbid which is contained in the generator without necessitating opening of the generating-chamber an indicator is provided, which descends with the carbid as the same is lowered by consumption and which extends to the outside of the generating-chamber. This indicator, as shown in Figs. 1, 2, and 6, consists of a follower or plate J, resting loosely on the charge of carbid and provided on one side with a socket $j$ and an indicator-rod J', having substantially the form of the letter U and extending with its bent lower part around the lower edge of the dome. The inner branch $j'$ of the indicator-rod is arranged vertically between the dome and shell of the generating-chamber and is provided at its upper end with a horizontal stem $j^2$, which projects inwardly through a vertical slot $j^3$ in the supporting-shell and engages detachably with the socket $j$ of the follower, while the outer branch $j^4$ of the indicator-rod is arranged vertically between the dome and the tank of the generator and extends with its upper end through an opening in the cover of the tank. When a fresh charge of carbid is placed in the machine, the charge is comparatively high and the outer end of the indicator-rod projects above the cover a considerable distance. As the charge of carbid gradually becomes lower by consumption the follower descending with the same moves the indicator-rod downwardly in the same measure, thus enabling the attendant to readily determine the amount of carbid in the generator. By extending the indicator-rod downwardly around the lower edge of the dome the rod passes through a water seal and is free to move without producing any leakage of gas from the generator.

Preparatory to introducing a new charge of carbid into the generating-chamber the water, together with the lime resulting from the decomposed carbid, is withdrawn from the tank by raising and opening the gate $a^2$ of the spout $a'$. After the water and lime have been withdrawn from the tank the cover $a^3$ and clamping-bar D are removed from the tank, the dome is removed from the shell, and the indicator-follower is removed from above the grate, so as to permit a new charge of carbid to be placed on the grate. After a new charge of carbid has been placed on the grate the indicator-follower, dome, and cover are replaced, the gate $a^2$ is closed, and the tank of the generator is again filled with water. As the water rises in the tank and in the generating-chamber the air is expelled therefrom. If the air which is expelled from the generating-chamber were carried by the connecting pipes or passages into the gas-holder, the gas in the latter would become diluted to such an extent as to impair its burning quality. In order to prevent excessive dilution of the gas, the bulk of air in the generating-chamber is conducted to the atmosphere during the operation of recharging the generator by a venting device, which is constructed as follows: K represents a hood of tubular form arranged vertically between the dome and the shell and secured to the dome, so as to be removable therewith. The upper end of this hood communicates with the upper end of the dome by an opening $k'$ in the side of the latter, Figs. 1 and 6, and the lower end of the hood is submerged in the water, so as to be sealed, and rests on the shelf of the tank. $k^2 k^3$ represent the inner and outer branches or members of a U-shaped sealed or trapped air-vent which extends around the lower edge of the dome. The outer branch $k^3$ is connected at its upper end with a main vent-pipe $k^4$, opening into the atmosphere, while its inner branch $k^2$ extends upwardly in the hood K to within a short distance below the upper side of the carbid support or grate. The water as it rises into contact with the carbid overflows the inner branch pipe $k^2$ and fills the same and its companion branch pipe $k^3$ to about the same level as that of the water in the generating-chamber. $l$ is a drain-cock which is arranged at the lower end of the trapped air-vent and whereby the latter may be opened or closed. When the generator requires recharging with carbid, the drain-cock $l$ is opened, so as to discharge the water therein and place the upper part of the generating-chamber in communication with the atmosphere. After a new charge of carbid has been placed on the grate and the dome has been fastened over the supporting-shell the drain-cock $l$ is again closed. Upon now refilling the generator-tank with water the rising water gradually displaces the air in the upper part of the generating-chamber and expels the same to the atmosphere through the trapped vent-pipe $k^2$ $k^3$, which remains empty until the water rises in the generating-chamber nearly to the top of the grate. When the water reaches this point, it overflows into the upper end of the inner branch pipe $k^2$ and fills both branch pipes $k^2 k^3$, thereby forming a water seal or trap in said pipes and preventing the escape of gas through said pipes when the water again recedes from the carbid under the pressure of the gas.

L represents a hand-lever whereby the drain-cock $l$ is opened and closed. The upper arm $l'$ of this lever is secured at its lower end to the plug of the drain-cock $l$ and projects with its upper end over the cover of the tank and over the dome of the generating-chamber when the cock is closed, as shown in Figs. 1 and 4. When the generator requires recharging with carbid, the upper arm of the lever L must be turned to one side, so as to clear the space above the cover and the dome, as shown in Fig. 5, before the cover and dome can be removed to afford access to the generating-chamber for supplying the same with carbid. When the lever is thus turned outwardly, the cock is opened, whereby the water in the trapped air-vent is discharged, thereby producing a vent for the escape of the air in the generating-chamber when the same is filled with water subsequent to charging the same with new carbid. After the attendant has recharged the generator with carbid and replaced the dome and cover and before refilling the same with water the hand-lever L must be turned so that its upper arm projects over the cover and dome, in which position of the lever the chamber is closed, and the trapped air-vent is automatically refilled with water when the latter rises above the upper end of the pipe $k^2$. If the attendant should fail to close the drain-cock, the escape of water from the same consequent upon the water overflowing into the pipe $k^2$ would prevent the water from reaching the carbid and would direct the attention of the attendant to this omission.

The hand-lever is provided with a lower arm $l^2$, which projects into the path of the gate $a^3$ of the waste-spout $a'$ when the drain-cock is closed, thereby preventing the gate $a^2$ from being raised for opening the spout while the drain-cock $l$ is closed. When the hand-lever is turned so as to clear the cover and dome, the drain-cock is opened and the lower arm of the lever is swung away from the gate of this spout, thereby permitting the gate to be opened for withdrawing the water and lime from the tank. After the tank has been emptied and a new charge of carbid has been placed in the generator the gate is closed, the dome and cover are replaced, and the hand-lever is turned so as to close the drain-cock and move its lower arm into the path of the gate and its upper arm over the cover and dome.

If desired, the cover of the tank may be omitted, in which case the upper arm of the hand-lever would project only over the dome when the cock is closed; but the employment of a cover is desirable, as it confines any stray gas that may escape from the generator. This means of constructing the venting device makes it impossible to open the generator for recharging the same with carbid and opening the waste-spout for removing the water and lime from the tank without at the same time providing an escape for the greater part of the air which enters the generator while recharging.

The gasometer or holder which receives the gas from the generator may be of any suitable construction, that shown in the drawings consisting, essentially, of a tank $b$, which contains water, and a vertically-movable bell $b'$, which is submerged with its lower end in the water of the tank $b$. The gas which is generated normally in the generator passes from the upper part of the generating-chamber outwardly through the opening $k'$ in the dome, thence downwardly through a pipe $m$, which is arranged with its upper part vertically in the hood K and with its inlet above the highest water mark or level, thence laterally through a horizontal pipe $m'$, thence upwardly through a vertical pipe $m^2$, thence laterally through a horizontal pipe $m^3$, thence downwardly through a vertical pipe $m^4$, thence upwardly and laterally through a pipe $m^5$, which extends into the gas-holder within the bell, thence downwardly through a reversely-bent pipe $m^6$, which terminates below the surface of the water in the holder, and thence upwardly through said water into the space within the upper part of the bell above the water. The gas passes from the bell downwardly through a pipe $n$, arranged within the tank and bell with its inlet above the water-line, thence laterally through a pipe $n'$, extending through the side of the tank $b$, and thence upwardly through a delivery-pipe $n^2$ to the place of consumption. The bell $b'$ rises and falls in a well-known manner in accordance with the quantity of gas generated.

The lower parts of the vertical pipes $m\ m^2$ and the horizontal pipe $m'$, connecting the lower ends of said vertical pipes, contain water, forming a water seal or column, through which the gas is compelled to pass before it can reach the gas-holder.

O represents a regulating-chamber which contains water and which is open at its upper end, while its lower end is connected with the lower end of the water column by a trap-pipe $o'$. The latter is deflected downwardly below the water column, so as to form a gas-trap, which prevents gas from passing from the pipe $m'$ at the lower end of the water column into the regulating-chamber, but permits the water to pass freely back and forth between the water column and the regulating-chamber.

P represents a vertically-movable plunger which is arranged in the regulating-chamber and whereby the height of the water column in the pipes $m\ m^2$ is varied. When free, the plunger descends by its own weight to the bottom of the regulating-chamber. The plunger is connected with the bell of the holder by intermediate mechanism, so as to be raised by the descent of the holder. The mechanism for this purpose shown in the drawings consists of a regulator-lever Q, pivoted on a suitable support and having one arm $q$, connected by a link $q'$ with the upper end of the plunger, and a tappet $q^2$, arranged on the bell of the gas-holder and adapted to engage the other arm $q^3$ of the regulator-lever during the descent of the bell, and thereby elevate the plunger. When the consumption of gas is equal to the production in the generator, the bell of the gas-holder stands in its lower position, in which its tappet engages the regulator-lever and turns the same so that the plunger is lifted, as shown in Fig. 1. In this raised position of the plunger a space is formed in the regulator-chamber underneath the plunger, into which the water flows from the water column and whereby the height of the water column is lowered. The height of the water column in this elevated position of the plunger is so determined that it only offers a slight resistance to the gas and permits the same to pass through the water column on its way from the generator to the holder. When the amount of gas generated exceeds the consumption, the bell of the gas-holder is raised by the surplus gas. As the bell rises its tappet recedes from the regulator-lever and allows the plunger to descend in the regulating-chamber, whereby the water is displaced in this chamber and caused to rise in the chamber and also in the pipes $m\ m^2$. The water column is thereby raised to such a height that it completely obstructs the passage of the gas through the pipes $m\ m'\ m^2$. The pressure of the gas in the generator is now expended wholly against the water in the generator, which causes this water to be pressed downwardly and out of contact from the carbid, thereby checking the generation of gas. When sufficient gas has been withdrawn from the gas-holder to permit the bell to descend and lift the plunger in the regulating-chamber, the water flows from the pipes $m\ m'\ m^2$ into the regulating-chamber, thereby reducing the height of the water column and permitting the gas to again pass through the water column from the generator to the gas-holder. When this takes place, the gas-pressure in the generating-chamber is gradually reduced and the water in the generator-tank is permitted to rise gradually into contact with the carbid, when the generation of gas is resumed. It will thus be seen that by automatically varying the height of the water column through which the gas passes on its way from the generator to the holder this column serves as a cut-off between the generator and holder and causes the excess production of gas to serve as a means for checking the production of gas.

Means are provided for relieving an unusually excessive gas-pressure in the generator before the water in the latter is depressed below the lower edge of the dome, thereby avoiding the danger of gas escaping from the generator around the lower edge of the dome. The means for this purpose shown in the drawings, Figs. 1, 6, and 7, consist of a hood R, secured to the outer side of the dome and having a closed upper end and an open lower end, which is submerged in the water of the generator, an opening $r$, arranged in the lower part of the dome and establishing communication between the lower part of the dome and this excess-hood, and an escape-pipe $r'$, opening with its upper end in the upper part of the excess-hood and connected at its lower end with the upper part of the pipe $m^2$ at a point above the highest water column which can be formed therein. If the gas-pressure in the generator continues to rise after the water-level has been depressed into the contracted neck $f$, the excess-opening $r$ is uncovered by the receding water. When this takes place, the excess gas passes from the dome through the opening $r$ into the excess-hood, thence downwardly through the excess escape-pipe $r'$, and thence through the pipes $m^3$ $m^4$ $m^5$ $m^6$ to the gas-holder, thereby passing around the water column and relieving the pressure in the generator. When the gas-pressure in the generator drops sufficiently, the water again rises and covers the excess-opening $r$, so that thereafter the gas is compelled to pass through the water column on its way from the generator to the gas-holder.

If desired, the inner branch $k^2$ of the vent-seal, the upper end of the main gas-pipe $m$, and the upper end of the excess gas-pipe $r'$ may open directly into the dome of the generating-chamber; but it is preferable to arrange these pipes in separate hoods on the dome, because this permits the dome to be fitted comparatively close around the carbid-supporting shell, and thereby reduces the air and gas space in the same to a minimum.

S represents a condensation-tank, which receives the condensation from the several conductor-pipes. This tank is open at its upper end and connected at its lower end by a drain-pipe $s$ with the lower ends of the pipes $n'$ $n^2$ and by a drain-pipe $s'$ with the lower ends of the pipes $m^4$ $m^5$. In order to prevent the escape of gas from the gas-holder through the condensation-tank, a safety vent-pipe $t$ connects the drain-pipe $s$ at a point below the level of the water in the condensation-tank with the main vent-pipe $k^4$. The water-level in the condensation-tank is so high that the pipe $t$ is sealed at its lower end by water to prevent the escape of gas under ordinary conditions. The junction of the pipes $m^4$ $m^5$ is preferably arranged so low that a small water seal $u$ is formed therein, which acts as a check to prevent the gas in the holder from backing through these pipes when the generator is opened for recharging the same.

Any excess water in the regulating-chamber O is conducted from the upper end of this chamber to the condensation-tank by a pipe $v$. The water-tanks of the generator and holder are preferably connected at their upper ends by a passage or pipe $w$.

I claim as my invention—

1. The combination with a water-tank, of a gas-generating chamber having its lower part provided interiorly with a downwardly-opening annular groove forming a moisture-trap, and a carbid-support arranged above said groove, substantially as set forth.

2. The combination with a water-tank, of a gas-generating chamber and carbid-support, said chamber having the lower part of its inner surface broken to provide below said support a holding device for a water-repellent material, and a water-repellent material held by said device, whereby moisture is prevented from being drawn upwardly on said surface by capillary attraction, substantially as set forth.

3. The combination with a water-tank, of a generating-chamber having its lower part provided interiorly with a downwardly-opening annular groove forming a moisture-trap, the upper wall of said groove being coated with a water-repellent material, substantially as set forth.

4. The combination with a water-tank, of a gas-generating chamber having its lower part, which is submerged in the water, composed of two overlying sections, forming a downwardly-opening annular groove between said sections, and a carbid-support arranged above said groove, substantially as set forth.

5. The combination with a water-tank, of a gas-generating chamber arranged in said tank and consisting of an inner shell which contains a carbid-support and an outer dome which incloses the shell, and an indicator consisting of a follower which is adapted to rest on the carbid and a U-shaped rod extending around the lower end of the dome and having its outer branch arranged between the dome and tank, while its inner branch is arranged between the dome and shell and is connected at its upper end with the follower, substantially as set forth.

6. The combination with a water-tank, and a gas-generating chamber arranged in the upper part of the tank and provided with a carbid-support, of a vent-pipe communicating with the generating-chamber at a point slightly below the supporting-surface for the carbid and extending downwardly from said point and then upwardly forming a water seal or trap, substantially as set forth.

7. The combination with a water-tank, and a gas-generating chamber arranged in the upper part of the tank and provided with a carbid-support, of a vent-pipe communicating with the generating-chamber at a point slightly below the supporting-surface for the carbid and extending downwardly from said point and then upwardly forming a water seal or trap, and a drain-cock arranged at the lower end of said water seal or trap, substantially as set forth.

8. The combination with a water-tank, and a gas-generating chamber arranged in the upper part of the tank and provided with a carbid-support, of a vent-pipe communicating with the generating-chamber at a point slightly below the supporting-surface for the carbid and extending downwardly from said point and then upwardly forming a water seal or trap, and a removable dome for the generating-chamber provided with a hood which incloses said vent-pipe and communicates at its upper end with said dome, substantially as set forth.

9. The combination with a water-tank, of a gas-generating chamber provided with a removable dome, a vent-pipe communicating with the generating-chamber and provided with a water seal, and a drain-cock connected with said water seal and provided with a lever which is arranged to project over said dome when the valve is closed, substantially as set forth.

10. The combination with a water-tank provided with a waste-gate, of a generating-chamber arranged in said tank and provided with a carbid-support and with a removable dome, a vent-pipe communicating with the generating-chamber and having a water seal, a drain-cock connected with said water seal, and a lever connected with the plug of said drain-cock and having upper and lower arms which are adapted to project, respectively, over said dome and into the path of said gate when the drain-cock is closed, substantially as set forth.

11. The combination with a water-tank and a gas-generating chamber arranged in the same, of a gas-delivery pipe leading from the generating-chamber and provided with a water seal or trap, and means whereby the column of water in said seal or trap may be raised or lowered to vary the resistance to the passage of the gas through said pipe, substantially as set forth.

12. The combination with a water-tank and a gas-generating chamber arranged in the same, of a gas-delivery pipe leading from the generating-chamber and provided with a water seal forming a water column, a regulating-chamber containing water and connected at its lower end with said water seal, and a vertically-movable plunger arranged in said regulating-chamber, substantially as set forth.

13. The combination with a water-tank and a gas-generating chamber arranged in the same, of a gas-delivery pipe leading from the generating-chamber and provided with a water seal, a regulating-chamber containing water and having its lower end provided with a water seal or trap which is lower than the seal forming the water column, and a vertically-movable plunger arranged in said regulating-chamber, substantially as set forth.

14. The combination with a water-tank, a gas-generating chamber arranged in said tank, and a gas-holder provided with a vertically-movable bell, of a gas-delivery pipe connecting the generating-chamber with the gas-holder and provided with a water seal, a regulating-chamber adapted to contain water and connected at its lower end with the lower part of said water seal, a vertically-movable plunger which is arranged in said regulating-chamber, and means by which said plunger is operated from said bell, substantially as set forth.

15. The combination with a water-tank, a gas-generating chamber arranged in said tank, and a gas-holder provided with a vertically-movable bell, of a gas-delivery pipe connecting the generating-chamber with the gas-holder and provided with a water seal, a regulating-chamber adapted to contain water and connected at its lower end with the lower part of said water seal, a vertically-movable plunger arranged in the regulating-chamber, a lever connected at one end with the plunger, and a tappet arranged on said bell and adapted to engage said lever and raise said plunger, substantially as set forth.

16. The combination with a water-tank and a gas-generating chamber arranged in said tank, of a main gas-delivery pipe connected with the generating-chamber above the highest water-line and having a water seal, and an excess-gas-escape pipe connecting the generating-chamber below the normal water-level with the main gas-pipe beyond the outlet of the water seal thereof, substantially as set forth.

17. The combination with a water-tank, of a gas-generating chamber arranged in said tank and having a removable dome and a hood which is submerged with its open lower end in the water and which communicates with the interior of the generating-chamber below the normal water-line, a main gas-delivery pipe communicating with the generating-chamber above the normal water-level and provided with a water seal, and an excess-gas-escape pipe opening at one end into the hood above the highest water-line therein and connected at its other end with the main gas-pipe beyond the outlet of the water seal thereof, substantially as set forth.

18. The combination with a gas-holder having a vertically-movable bell, of a water-tank, a gas-generating chamber arranged in the upper part of said tank and having a removable dome provided with a main hood and an excess-hood, which hoods are submerged with their open lower ends in the water of the tank, said main hood communicating at its upper end with the generating-chamber above the highest water-line, while the excess-hood communicates with the generating-chamber below the normal water-level in the same, a main gas-delivery pipe containing a water seal and opening at one end into the main hood above the highest water-line therein and opening at its other end into the gas-holder, an excess-gas-escape pipe opening at one end into the excess-hood above the highest water-line therein and connected at its other end with the main gas-pipe beyond the outlet of the water seal therein, a regulating-chamber connected at its lower end with said water seal, a vertically-movable plunger arranged in said regulating-chamber, and means whereby said plunger is operated from the bell of the gas-holder, substantially as set forth.

Witness my hand this 5th day of December, 1900.

DAVID N. LONG.

Witnesses:
A. L. HOUGH,
FRANKLIN H. HOUGH.